US006889991B1

(12) United States Patent
Facer et al.

(10) Patent No.: US 6,889,991 B1
(45) Date of Patent: May 10, 2005

(54) CAM ENGAGED, LEVER PROPELLED WHEELCHAIR

(76) Inventors: Madeline T. Facer, 1009 Blossom River Way, #217, San Jose, CA (US) 95123; Thomas C. Maes, 1009 Blossom River Way, #217, San Jose, CA (US) 95123

( * ) Notice: Subject to any disclaimer, the term of this patent is extended or adjusted under 35 U.S.C. 154(b) by 0 days.

(21) Appl. No.: 10/749,286

(22) Filed: Dec. 30, 2003

(51) Int. Cl.$^{7}$ .......... B62M 1/14
(52) U.S. Cl. .......... 280/244; 280/250.1; 280/304.1
(58) Field of Search .......... 280/304.1, 250.1, 280/242.1, 244, 253

(56) References Cited

U.S. PATENT DOCUMENTS

| | | | | |
|---|---|---|---|---|
| 3,189,368 | A * | 6/1965 | Petersen | 280/250.1 |
| 3,301,574 | A * | 1/1967 | Good | 280/211 |
| 3,869,146 | A * | 3/1975 | Bulmer | 280/250.1 |
| 3,877,725 | A * | 4/1975 | Barroza | 280/250.1 |
| 3,994,509 | A | 11/1976 | Schaeffer | 280/242 WC |
| 4,274,651 | A | 6/1981 | Dumont | 280/242 WC |
| 4,358,126 | A | 11/1982 | Mitchell et al. | 280/242 WC |
| 4,538,826 | A * | 9/1985 | Lemarie | 280/250.1 |
| 4,560,181 | A | 12/1985 | Herron | 280/242 WC |
| 4,691,933 | A | 9/1987 | Strauss | 280/289 WC |
| 5,020,815 | A | 6/1991 | Harris et al. | 280/246 |
| 5,037,120 | A | 8/1991 | Parisi | 280/250.1 |
| 5,303,945 | A | 4/1994 | Oxford | 280/304.1 |
| 5,577,748 | A | 11/1996 | Dombrowski et al. | 280/244 |
| 5,826,897 | A | 10/1998 | Beard | 280/250.1 |
| 5,988,661 | A * | 11/1999 | Garfinkle | 280/250.1 |
| 6,007,082 | A | 12/1999 | Watwood et al. | 280/244 |
| 6,308,804 | B1 | 10/2001 | Roberts | 188/2 F |

FOREIGN PATENT DOCUMENTS

| | | | |
|---|---|---|---|
| GB | 2213438 | * | 8/1989 |
| WO | WO90/07316 | * | 7/1990 |

* cited by examiner

*Primary Examiner*—Anne Marie Boehler
(74) *Attorney, Agent, or Firm*—Thomas Schneck; Gina McCarthy; Mark Protsik

(57) ABSTRACT

A drive for a wheelchair having two larger diameter drive wheels with axles, the drive with regard to each drive wheel, including inner and outer disks flanking the drive wheel and being in fixed rotational relation with the drive wheel about the axle, a lever having a lever axis, the lever rotatable about the axle and about the lever axis, a cam selectively rotatable about the lever axis by the lever to and from a contact position and a non-contact position with respect to the outer disk, and a shoe positioned for contact engagement with the inner disk when the cam is in the first position. When the lever is rotated about the axle, and the cam is in the contact position, the cam and the shoe frictionally engage the respective disks propelling the wheelchair.

26 Claims, 7 Drawing Sheets

CAM ENGAGED, LEVER PROPELLED WHEELCHAIR

FIELD OF THE INVENTION

The present invention relates generally to wheelchairs, and in particular, to drive mechanisms for wheelchairs.

BACKGROUND OF THE INVENTION

About 20 years ago, one of us (Madeline), was involved in an automobile accident and was confined to a wheel chair for two weeks. There was no problem as long as there was someone to push me. However, at the clinic one day I had to go to the restroom at the lunch hour. There was no one to push me and it was then I found how difficult it is to move that chair by pulling on the wheel attached thereto for that purpose. I have what is known as a "frozen shoulder" meaning there are calcium deposits at the joint which makes it very painful to move the arm. I also had and still have arthritis in my hands. Though they are only slightly deformed they are very painful and I had to stop playing piano. There was no way I could move that chair more than a few inches at the time. I finally made it to the restroom where some kindly person opened the door. I had to stay there until lunch hour was over and patients and attendants had returned as I could not open the door and keep it open while I pulled on that wheel and moved a few inches at the time.

I thought then "why doesn't someone invent a wheel chair that can be moved by a lever?" When I recovered, I forgot about it but I did remember to always ask a person in a wheelchair if they wanted to be pushed.

Two years ago, I was in a rehab where I was sent for therapy after a month in the hospital with chronic pain. After therapy, I had to get back to my room on a wheelchair. I am now twenty years older, chronic pain in shoulders, arms, back, and hands and the wheelchairs are just the same old wheelchairs. There was no way I could move the chair with the small grip wheel there for that purpose. I did what the other patients did: I took hold of the banister with both hands and pulled. I moved forward about twelve inches. I spent the rest of my six weeks at rehab thinking of how I would improve wheelchairs. I came up with several versions. When I got home I had to have round the clock care for five months and when I got better I forgot about the wheelchair.

I live in a retirement home. We have a resident who is in her early fifties. At dinner one evening, she was holding her dinner plate in her lap, pulling on that little grip wheel, moving inches at the time, on her way to her apartment. After dinner I drew some sketches of the ideas I had for easy to propel wheelchairs. Then my grandson devised some clever mechanisms and helped me build my prototype. We submit herewith a patent application for a wheelchair engaged by a cam and propelled by a lever.

A typical manually operated wheelchair has hand operated push rims fixed on wheelchair drive wheels. A user grips the push rims and continually pushes and release the push rims for movement of the wheelchair. Such gripping and pushing motions are difficult and painful for some users. Additionally, such wheelchairs are difficult to maneuver.

Thus, there has been a need to overcome problems associated with wheelchairs operated by push rims. Alternatives to gripping and pushing the rims are known in the art. For instance, U.S. Pat. No. 5,577,748 to Dombrowski et al. discloses a wheelchair having a lever arm that includes a pad having a contact surface and a drum attached to a drive wheel having a contact surface. The lever arm is movable between first and second lateral positions such that the contact surface of the drum and arm are engaged. While the contact is maintained, the arm is rotated in a first direction to cause the wheelchair to advance. At the bottom of the first stroke the user releases the inward force on the arm causing the arm to move back to the second position. The arm is rotated in a second direction for a backward movement.

U.S. Pat. No. 6,007,082 to Watwood et al. describes another alternative drive for a wheelchair including a lever having a handle and a rotating pawl mounted on the lever in a position to contact an upper surface of a tire of each wheel. A surface of the pawl includes teeth that grip the wheel and transfer rotational force to the wheel when the user pusher forward on the lever. After a stroke in one direction, a user pulls back the lever towards his body and the pawl releases the tire such that the wheelchair's momentum carries the wheelchair along.

A disadvantage of wheelchairs in the prior art is that they tend to include a large number of components making them difficult to assemble. Other disadvantages of prior art wheelchairs is that they are cumbersome and difficult to transport.

It is an object of the present invention to provide a new and improved drive for a wheelchair.

It is an additional object of the present invention to provide a new and improved wheel chair drive.

It is an additional object of the present invention to provide a wheelchair drive having a small number of components.

SUMMARY OF THE INVENTION

These and other objects have been achieved by a drive associated with each drive wheel of a wheelchair. The drive includes a pair of disks flanking the drive wheel, a cam which is selectively rotated about a lever axis by a lever to and from a first position in which contact with the first-disk is achieved and a second non-contact position, and a shoe positioned for contact with the second disk when the cam is in the first position. When the cam contacts the first disk and the shoe contacts the second disk, the drive wheel is in a sandwiching relation with the cam and the shoe. When the cam is in the first position and upon lever rotation about the axle in a first direction, the cam and the shoe frictionally engage the respective disks, propelling the wheelchair. Selective rotation of the cam about the lever axis to the second position releases the drive wheel.

The cam includes an opening through which the lever is inserted. The cam also includes lesser and greater length sections. The opening is used to divide the cam into lesser and greater length sections. The lesser length section includes a first outer surface that does not make contact with the first disk. The greater length section includes a second outer surface that selectively contacts the first disk. Upon lever rotation about the lever axis, the lesser and greater length sections of the cam are also rotated about the lever axis. When the cam is selectively rotated by the lever such that the first outer surface of the lesser length section faces the first disk, cam contact with the first disk does not occur as the lesser length section is not long enough to make contact with the first disk. Therefore, propulsion of the wheelchair will not occur. If the wheelchair is already in motion, that motion will not be affected by rotation of the lever arm about the axle while the cam is in the second position.

When the cam is selectively rotated by the lever such that the second outer surface of greater length section faces the first disk, cam contact with the first disk occurs as the greater length section is long enough to make contact with the first disk at a contact surface. The action of the cam contacting the first disk results in the sandwiching relation of the drive wheel relative to the shoe and the cam. Upon lever rotation about the axle, the cam frictionally engages the first disk and rotates about the axle and the shoe frictionally engages the second disk and rotates about the axle, propelling the wheel chair. When the cam is in the contact position, the shoe is contacting the second disk. The shoe contact with the second disk occurs due to pushing forces of the cam against the first disk which pushes the second disk against the shoe. Pressure on the first disk from the cam results in a pinching effect on the first disk which causes a pinching effect on the second disk.

Propulsion is achieved by the selective rotation of the cam into the first position and rotation of the lever about the axle, with or without the presence of the shoe. However, the shoe will impart additional forces on the other side of the drive wheel when the cam is in the first position assisting in gripping the drive wheel.

In order to move forward in the wheelchair, a user rotates the lever about the lever axis such that the greater length section of the cam makes contact with the outer disk. The user then rotates the lever in a first direction about the axle to cause the wheelchair to move forward. Rotation of the lever about the lever axis and the axle will occur simultaneously or sequentially. At the bottom of the first stroke, the user rotates the lever about the lever axis such that the lesser length section of the cam faces the first disk. Thus, a gap is present between the first disk and the cam allowing for free rotation of the lever about the axis. The shoe is disengaged from the second disk upon rotation of the cam to the lesser length section. The lever is then freely rotated back to a top position for another forward stroke.

To achieve a backward movement, the user selectively rotates the lever about the lever axis such that the lesser length section of the cam faces the outer disk, thus the user is able to freely move the lever to a bottom position without frictionally engaging the disk. At the bottom position, the user rotates the lever about the lever axis such that the greater length section of the cam contacts the outer disk. Upon rotation of the lever back to a top position, a user moves the wheelchair rearward.

In one embodiment of the present invention, the wheelchair includes a handle which imparts motion to the lever. The handle is connected in fixed rotational relation with the lever and is rotated about the lever axis in order to rotate the lever about the lever axis. Additionally, the handle is pushed and pulled upon in order to rotate the lever about the axle. The handle is advantageous in that it assists a user in achieving motion of the lever.

The invention is advantageous in that it comprises a small number of components and therefore is easy to manufacture and assemble. Further, the present invention is easier to manipulate than push rim devices of the prior art.

DETAILED DESCRIPTION OF THE INVENTION

Figure 1:
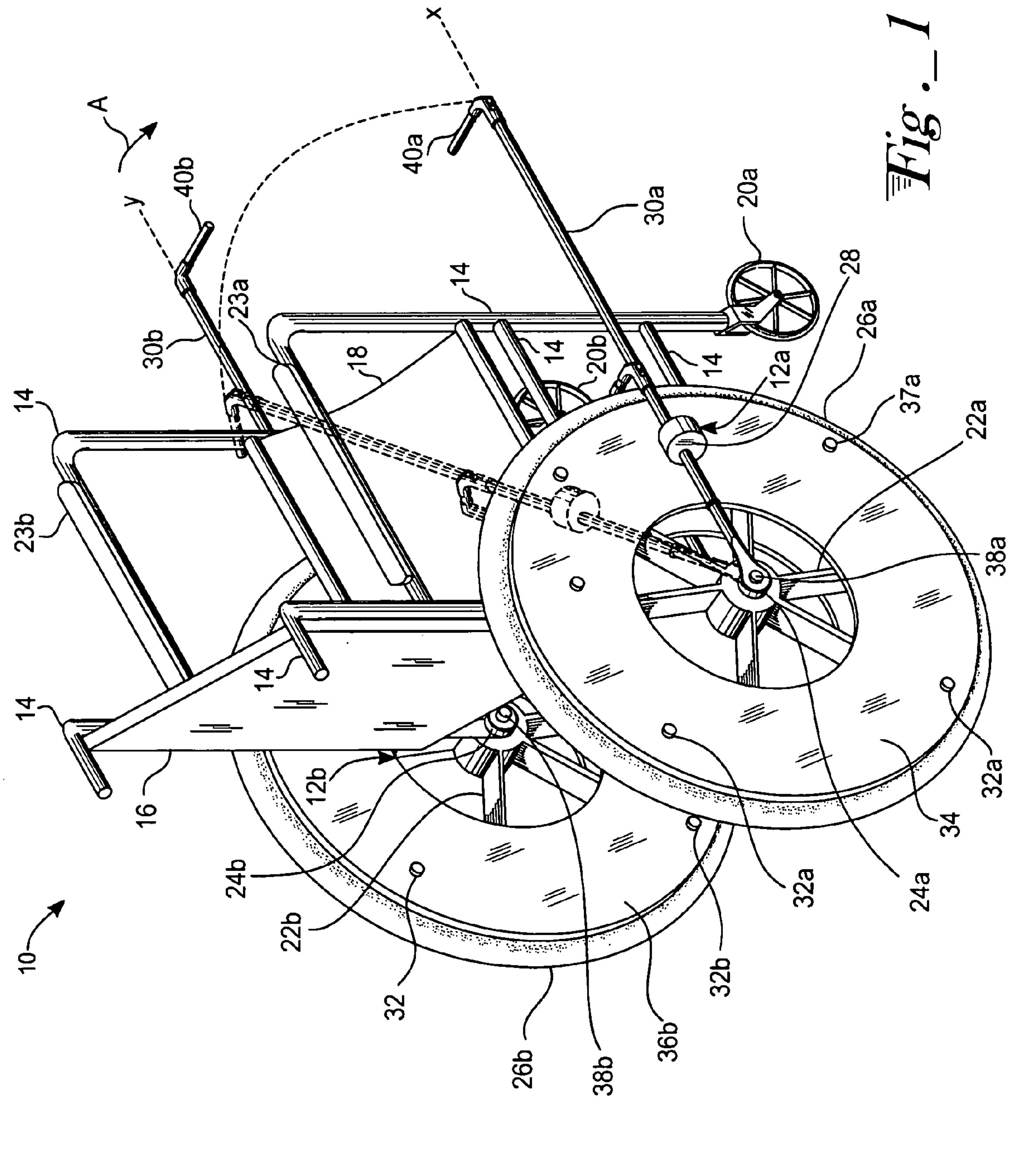
FIG. 1 is a perspective view of a wheelchair featuring a pair of drives of the present invention.

With reference to FIG. 1, a wheelchair 10 featuring a pair of drives 12*a* and 12*b* of the present invention is shown. The wheelchair 10 includes a frame 14, a backrest 16, a seat 18, a pair of smaller diameter wheels 20*a* and 20*b* mounted to a front baseportion of the frame 14, a pair of arm rests 23*a* and 23*b*, a pair of larger diameter drive wheels 22*a* and 22*b*, each having an axle 24*a* and 24*b* mounted therethrough, respectively, and a pair of tires 26*a* and 26*b* disposed about the larger diameter drive wheels 22. Each drive mechanism features a cam, such as for example, cam 28, selectively rotatable by a lever 30*a* or 30*b* about a lever axis x or y, respectively, to selectively propel the wheelchair 10. The drives 12*a* and 12*b* each include a cam and a pair of disks flanking each drive wheel 22*a* and 22*b*. Each of the drive wheels includes an external disk 34 and an internal disk 36, though not both seen in FIG. 1 with respect to each drive wheel. The disks cover internal and external surfaces of the drive wheel and are substantially the size and shape of the drive wheel. In this example, the disks are round and extend to the tires. In FIG. 1, an external disk 34, proximate to an external surface of drive wheel 22*a*, is shown and an internal disk 36*b* proximate to an internal surface of drive wheel 22*b* is apparent. In one example, the disks are plastic. The disks protect the spokes and assist in preventing undesirable material from entering the wheel. Also, the disks provide a large contact surface. Each external disk is connected to an internal disk. External disk 34 is connected to internal disk 36*a* by bolts 32*a*. Internal disk 32*b* is connected to its corresponding external disk (not shown) by bolts 32*b*. Other connection means can be used to connect each external disk to the corresponding internal disk.

With reference to drive 12*a*, lever 30*a* is rotatable about lever axis x and is connected to and rotatable about axle 24*a* as seen in FIG. 1, through for example, bolt 38*a*. With reference to drive 12*b*, lever 30*b* is rotatable about the lever axis y and is connected to and rotatable about axle 24*b*, through for example, bolt 38*b*. In one example, each lever comprises aluminum tubing. The tubing, for example, has a 0.95 cm (0.375 inches) diameter. The length of the lever is such that a user will be able to easily reach it for operation of the wheelchair.

Figure 3B:
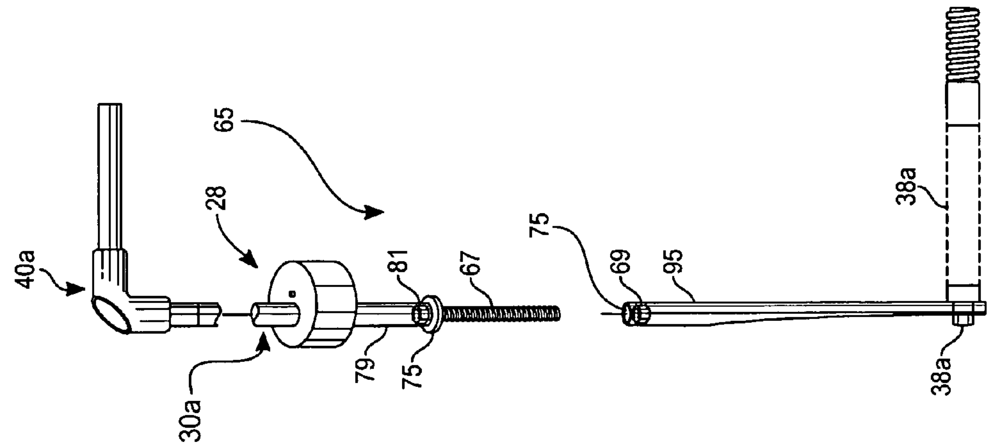
FIG. 3*b* is a exploded view of a rotation joint of FIG. 3*a*.

In one example, each lever 30*a* and 30*b* rotates about the x or y axis at a rotation joint seen in FIG. 3*b*. Rotation joint 65 includes a threaded portion 67 which is threaded into a threaded nut 69 within a lower sleeve 95 of the lever 30*a*.

The threaded portion 67 is held in place within an upper sleeve 79 of lever 30*a* with a nut 81. A washer 75 relieves friction at the rotation joint 65.

In one embodiment, levers 30*a* and 30*b* are connected to or include a handle, such as for example, 40*a* or 40*b*, respectively, each of which is, in one example, substantially transverse to the respective lever. Each handle is in fixed rotational relation with the respective lever about the x or y axis. The handle assists in rotation of the lever and the cam.

Figure 4B:
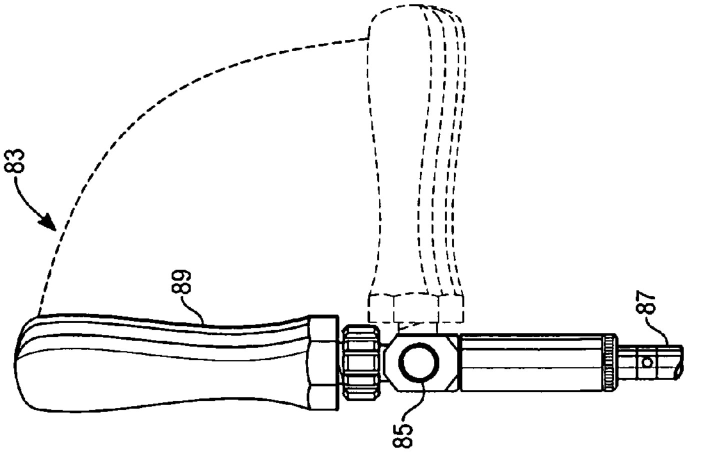
FIG. 4*b* is a perspective view of another example of a handle of the present invention.

In another example, as seen in FIG. 4*b*, handle 83 is pivotable at a pivot 85. The handle 83 comprises a ratchet wrench with a tip 87 connected to the lever and grip 89 which is rotatable, for example, from a position substantially transverse to the lever to a position in alignment with the lever.

Typically, when the handle is in alignment with the lever, the cam is in a non-contact position, and when the handle is substantially transverse to the lever, the cam is in a contact position. This is because it is generally easier for a user to push and pull upon the handle of each lever, in order to rotate the levers about the axle in clockwise and counter clockwise directions, when the handle is in the substantially transverse position. However, the handle positions can be reversed or otherwise altered. It is desired that when the contact position is achieved, the handle is in a position relative to the lever which is easier for the user to grasp.

Each cam is selectively rotated to and from a contact position with respect to the external disk 34 of each drive by the respective lever. When the cam is selectively rotated to a contact position with respect to the external disk 34 and the lever is rotated about the axle 24, the wheelchair 10 is propelled in a desired direction, as will be described in further detail below.

Drive wheel 22*b* is associated with the same drive mechanism elements as drive wheel 22*a*, therefore, drive mechanism 12*a* will only be described with reference to drive wheel 22*a*. With reference to FIGS. 1, 2*b*, 2*c*, and 2*d*, cam 28 is cylindrical in shape and includes an off-center opening 42 through which the lever 30*a* is inserted. The off-center opening 42 is wide enough to insert the lever 30*a* therethrough and is held with a set screw so that the cam 28 cannot slide up and down the lever 30*a*.

The cam includes lesser and greater length sections to achieve non-contact and contact positions with respect to the external disk. The off-center opening 42 is used to divide the cam into lesser length section 44 and greater length sections 46*a* and 46*b*, indicated, for ease in describing the invention, by the dotted lines in FIGS. 2*c* and 2*d*. Lesser length section 44 includes outer surface 63 and greater length sections 46*a* and 46*b* include outer surfaces 61*a* and 61*b*, respectively. In one example, the outer surfaces may range in size from a few millimeters to a centimeter. The outer surfaces may also be larger or smaller depending, for example, on the size and shape of the cam and/or the size and position of the opening. In one example, a length $L_1$ of the lesser length section is about 1.9 cm (0.75 inches) measured from a center d of the opening and lengths $L_2$ of the greater length sections 46*a* and 46*b* are about 2.5 cm (1 inch) measured from d. The lengths increase along the perimeter of the cam 28 starting from the lesser length section 44 and moving toward either of the greater length section 46*a* or 46*b*. The cam 28, for example, can have a diameter of about 6.35 cm (2; inches) and will, for example, be about 2.54 cm (1 inch) in thickness. Upon lever rotation about the lever axis x, the lesser and greater length sections of the cam 28 are also rotated about the lever axis x.

Figures 2A, 2B, 2C, 2D:
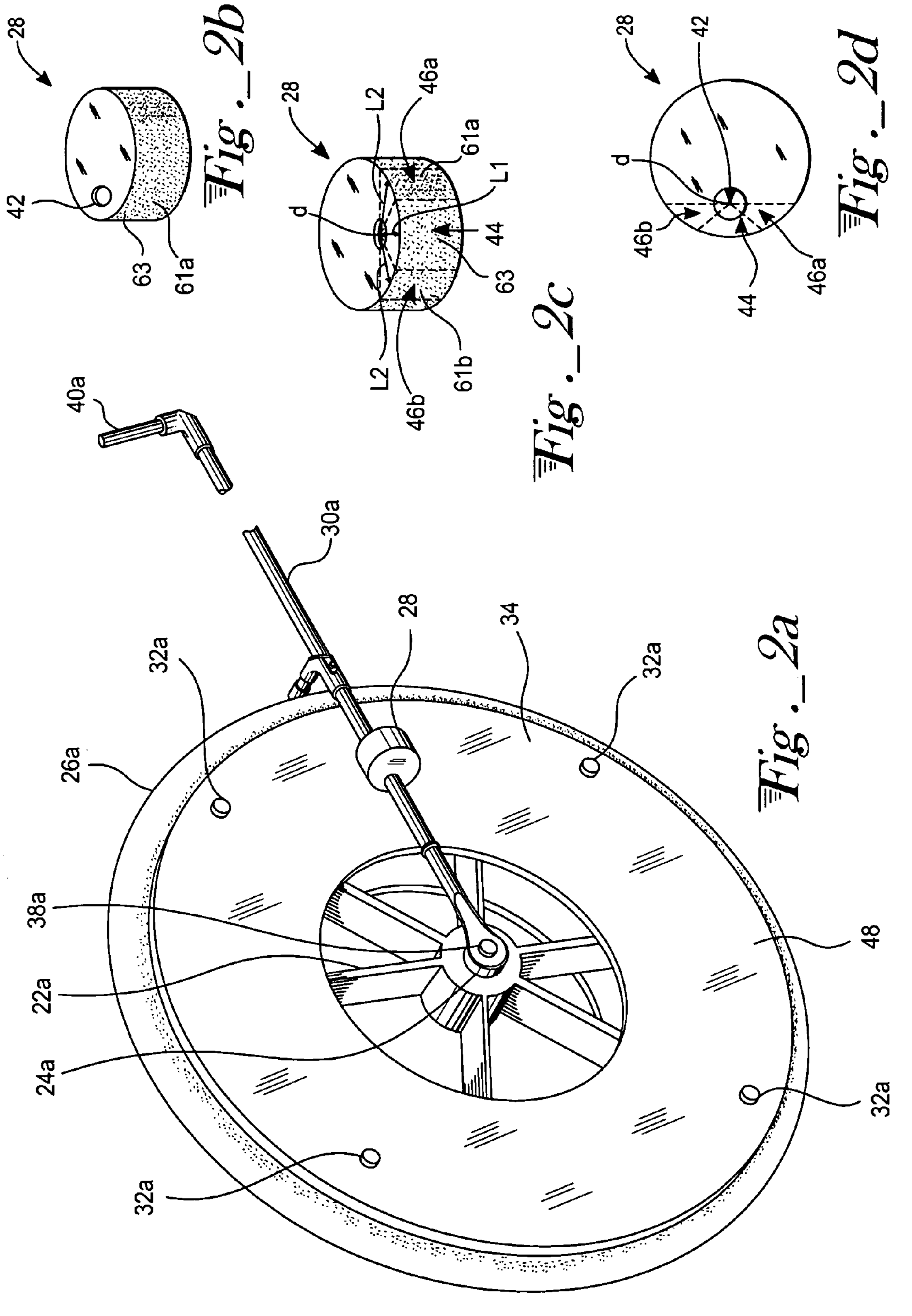
FIG. 2*a* is a perspective view of a part of the wheelchair of FIG. 1 in a first position.
FIG. 2*b* is a perspective view of a cam of FIG. 2*a*.
FIG. 2*c* is another perspective view of the cam of FIG. 2*a*.
FIG. 2*d* is a top view of the cam of FIG. 2*a*.
Figure 2G:
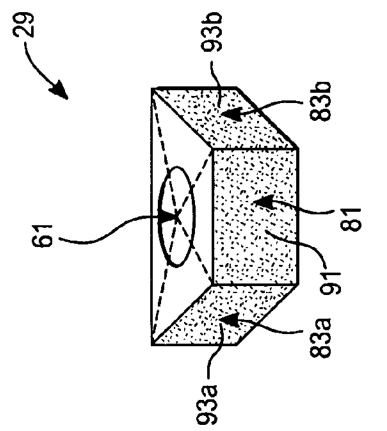
FIG. 2*g* is a perspective view of the cam of FIG. 2*f*.
Figure 2E:
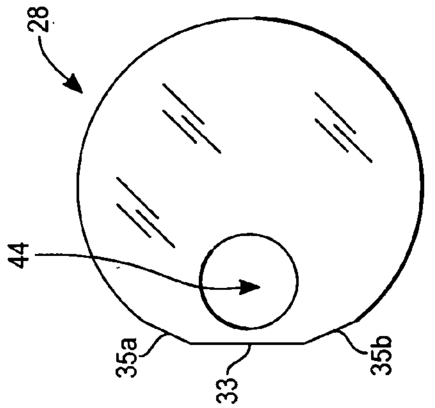
FIG. 2*e* is a top view of an alternative embodiment of the cam of FIG. 2*a*.

In FIG. 2*e*, the greater and lesser length sections of cam 28 are flattened. Perimeter surfaces 33, and 35*a* and 35*b* of cam 28' are flattened. Flattened lesser and greater length sections can also include flattened outer surfaces (not shown) of 61*a*, 61*b* and 63 which are in vertical alignment with the flattened perimeter surfaces. Flattened outer surfaces provide a greater area at which contact of the greater length sections would occur with respect to external disk 34 and a greater area at which non-contact of the lesser length section would occur with respect to external disk 34. In one example, flattened perimeter surfaces are each 1 cm (0.39 inches) long.

Figure 2F:
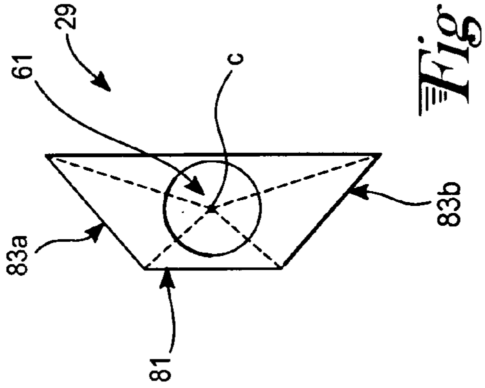
FIG. 2*f* is a top view of another example of a cam of the present invention.

In FIGS. 2*f* and 2*g*, the cam shape is not restricted to a particular shape and need not be cylindrical-like in shape. For instance, cam 29 includes, for example, a four sided top surface with an opening 61 and may have, for example, six surfaces total. Lesser length flat section 81 and greater length flat sections 83*a* and 83*b* may be included in cam 29, as indicated in part by the dotted lines, measured, for example, from a center c of opening 61. A flat outer surface 91 of section 81 provides a greater area for non-contact for lesser length section 81 with respect to external disk 34 than would for instance, a curved surface. Flat outer surfaces 93*a* and 93*b* of flat sections 83*a* and 83*b*, respectively, provide a greater area upon which contact may occur with external disk 34 than would for instance, curved surfaces.

The cam is, in one example, made of a hard plastic material, so as to be able to withstand frictional forces that occur between the cam and the external disk 34 in the contact position upon rotation of the lever 30*a* about the axle 24*a*, as will be described below. It is desirable that the cam comprise a material having good tread characteristics.

Figure 5:
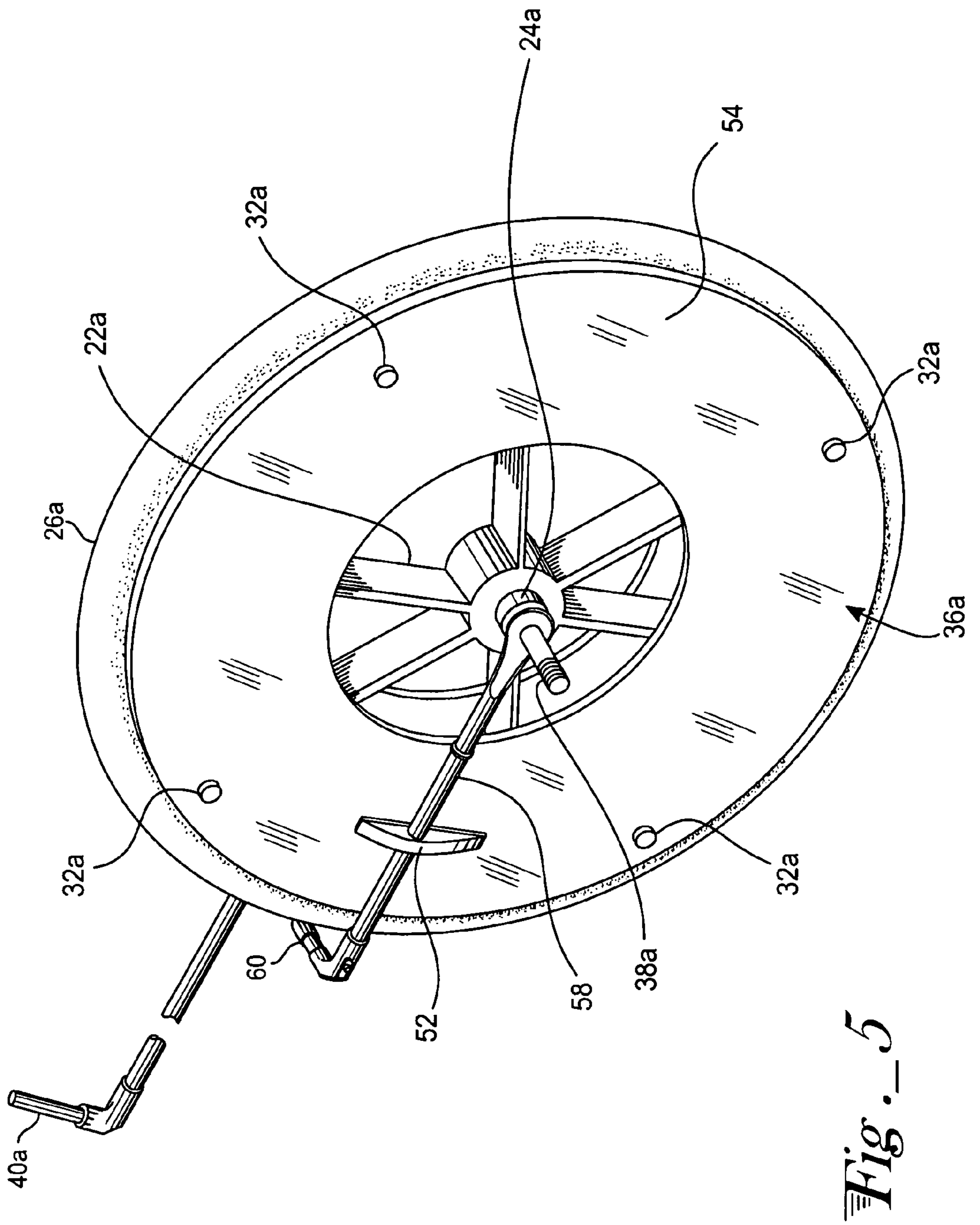
FIG. 5 is another perspective view of the part of the wheelchair of FIG. 2*a*.
Figure 6:
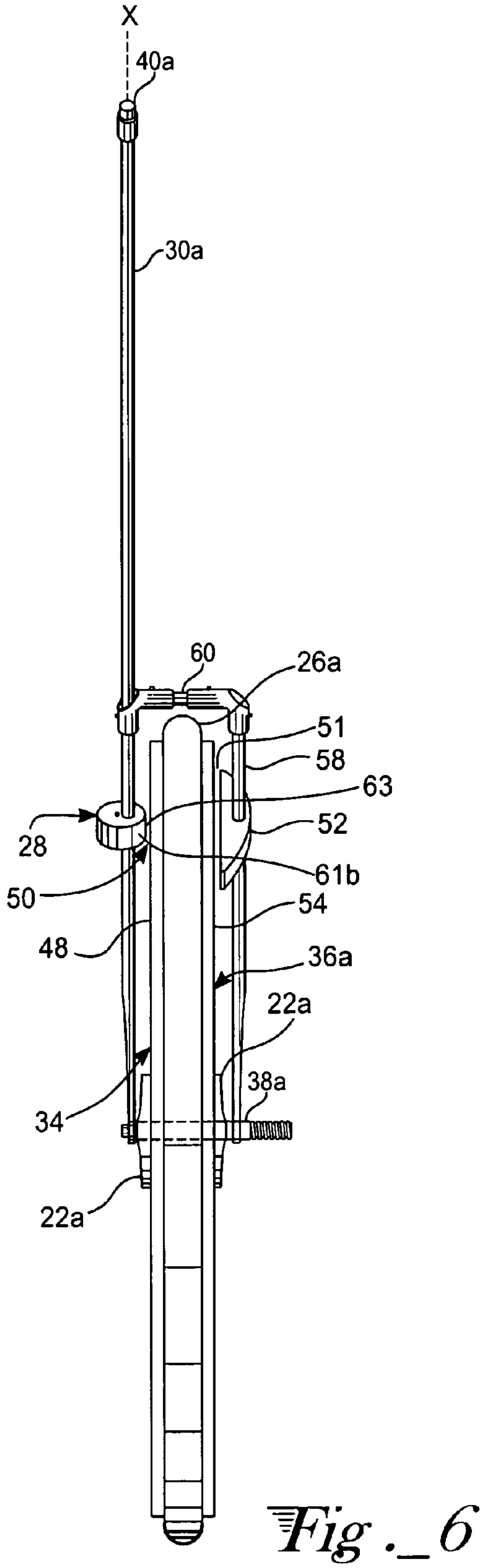
FIG. 6 is a front view of a part of the wheelchair of FIG. 1 in a non-contact position.

With reference to FIGS. 2*a*, 5, and 6, the cam 28 has been rotated about the lever axis x by the lever 30*a* such that it is in a non-contact position with respect to a contact surface 48 of the external disk 34. When the cam 28 is rotated by the lever 30*a* such that the lesser length section 44, including outer surface 63, faces the external disk 34, cam contact with the external disk 34 does not occur as the lesser length section 44 is not long enough to make contact with the external disk 34. Therefore, the wheelchair 10 will not be propelled. If the wheelchair is already in motion, that motion will not be affected by rotation of the cam 28 to the non-contact position. The lever handle 40*a* is typically pointing upwardly in the non-contact position of the cam 28. In the non-contact position, a gap 50 exists between the contact surface 48 of the external disk 34 and the cam 28. In FIG. 6, a shoe 52 is disposed proximate to a contact surface 54 of an internal disk 36*a*. The shoe 52, in one example, is made of rubber. A gap 51, pictured in FIG. 6, between the contact surface 54 of the internal disk 36*a* and the shoe 52 is present when the cam 28 is in the non-contact position. The shoe 52 includes an opening (not seen) through which a rod 58 is inserted. The rod 58 is connected to the lever 30*a* via, for example, a connecting bar 60. The shoe 52 is fixed relative to the rod 58. When the cam 28 is in the non-contact position, the shoe 52 is not contacting the contact surface 54 of the internal disk 36*a* so as not to interfere with any momentum the wheelchair may have.

Figure 3A:
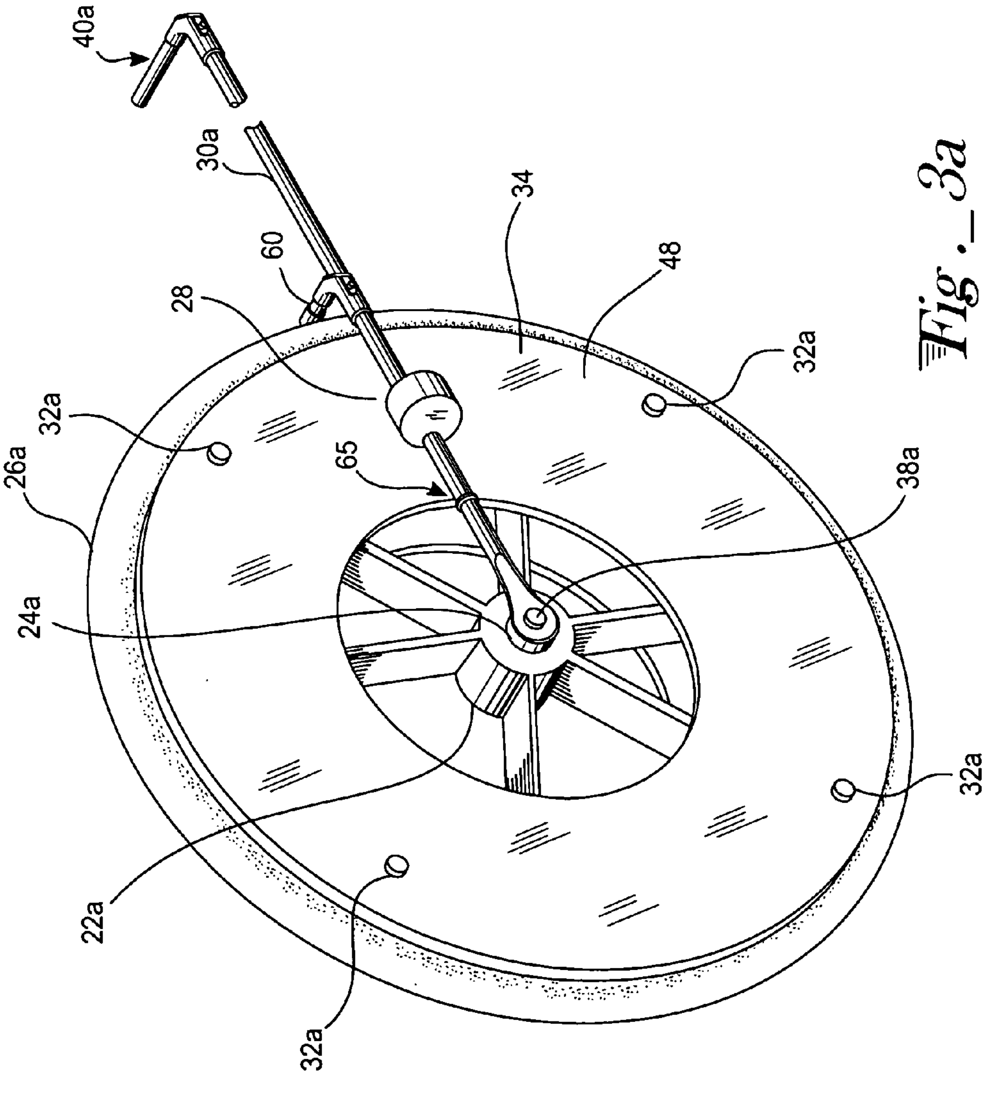
FIG. 3*a* is a perspective view of a part of the wheelchair of FIG. 1 in another position.
Figure 4A:
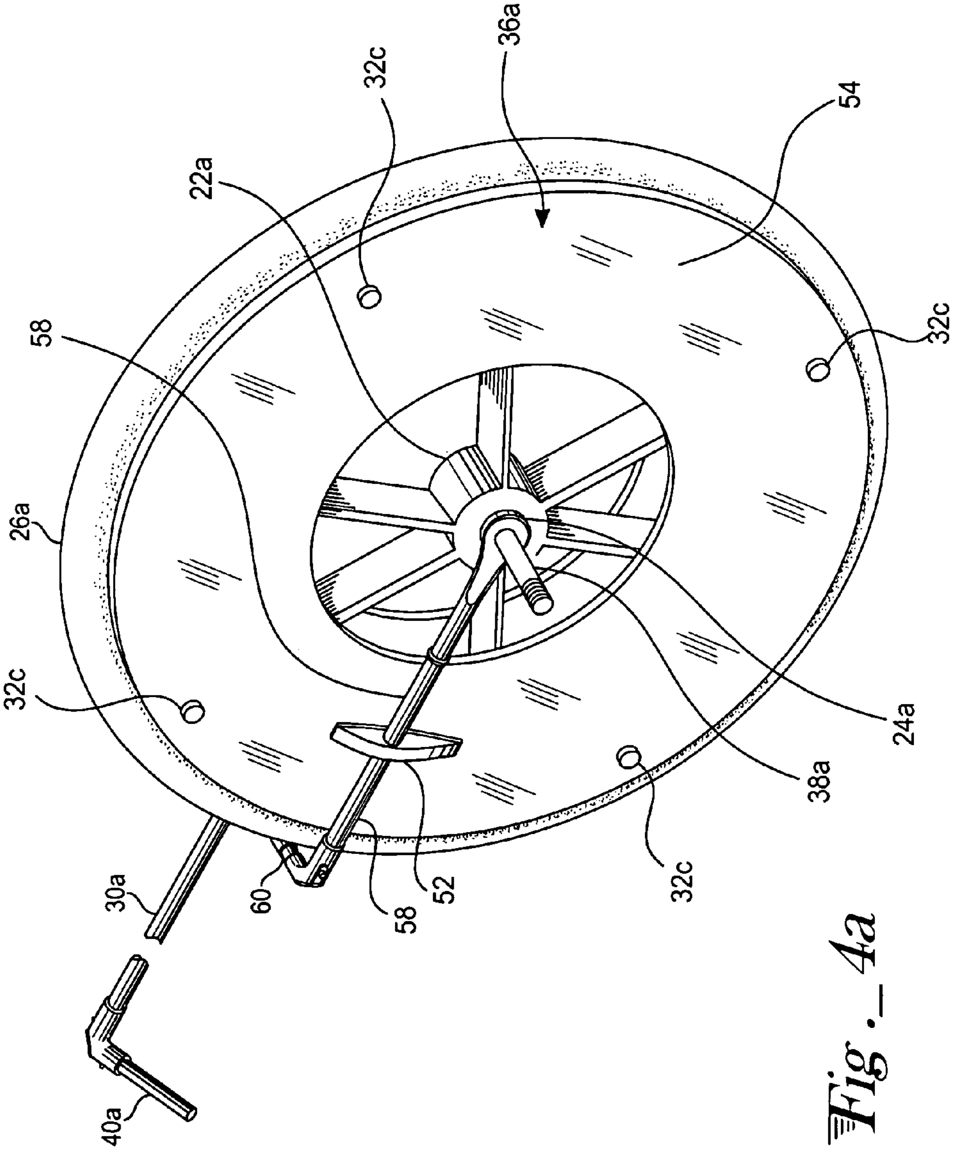
FIG. 4*a* is another perspective view of the part of the wheelchair of FIG. 3*a*.
Figure 7:
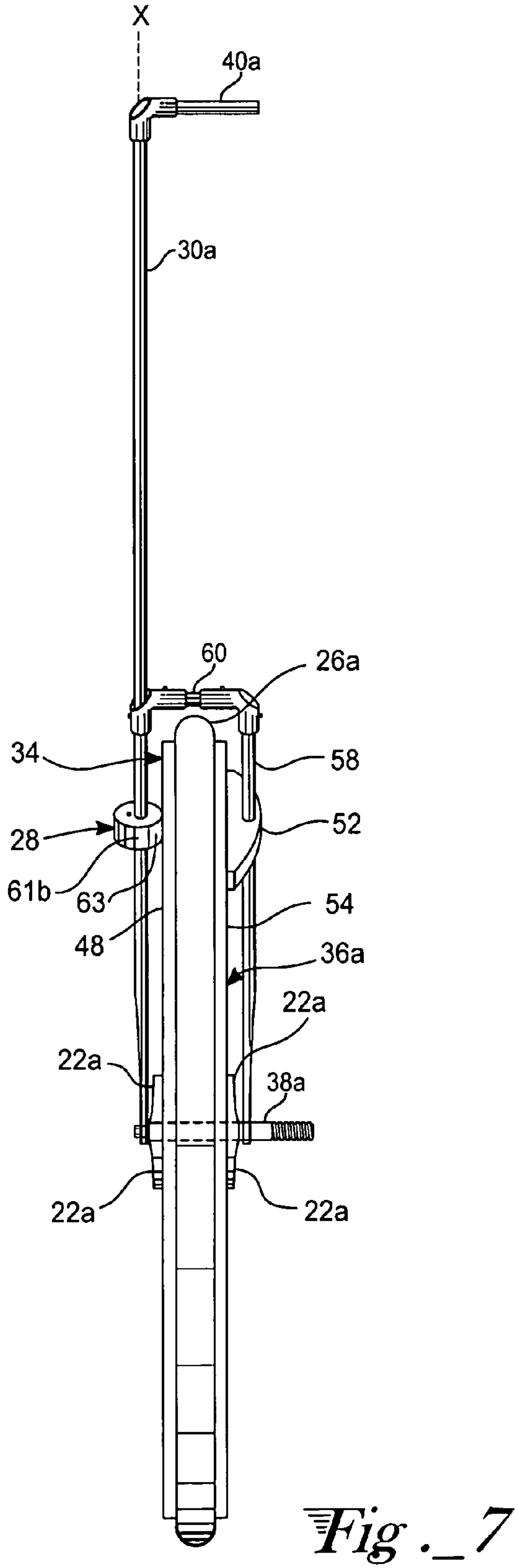
FIG. 7 is a front view of a part of the wheelchair of FIG. 1 in a contact position.

With reference to FIGS. 3*a*, 4*a*, and 7, the cam 28 has been rotated about the lever axis x by the lever 30*a* such that it is in a contact position with respect to the contact surface 48 of the external disk 34. When the cam 28 is rotated by the lever 30*a* such that the greater length section 46*a* or 46*b*, including outer surfaces 61*a* or 61*b*, respectively, faces the external disk 34, cam contact with the external disk 34 occurs at an outer surface 61*a* or 61*b* as the greater length section 46*a* or 46*b* is long enough to make contact with the external disk 34 at the contact surface 48. In the example of FIG. 7, outer surface 61*a* (not seen) contacts external disk 34. The lever handle 40*a* is pointing in an inward direction in the contact position of the cam 28. In the contact position, gap 50 is not present between the contact surface 48 of the external disk 34 and the cam 28, as seen in FIG. 7. In FIG. 7, the shoe 52 is shown contacting the contact surface 54 of internal disk 36*a*. When the cam 28 is in the contact position, the shoe 52 is contacting the contact surface 54 of the internal disk 36*a* so that the drive wheel is sandwiched between the shoe 52 and the cam 28 and gap 51 is not present. Upon lever rotation about the axle 24*a*, the cam 28 frictionally engages the external disk 34*a* and rotates about the axle 24*a* and the shoe 52 frictionally engages the internal disk 36*a* and rotates about the axle 24*a*, propelling the wheelchair 10. As seen in FIG. 7, the cam 28 and shoe 52 are connected together by connecting bar 60 and therefore rotate together about the axle 24*a*. The drive wheel 22 is released from the sandwiching relation upon lever rotation of the cam to the non-contact position.

When the cam 28 is in the contact position, the shoe contacts the internal disk 36*a*. The shoe contact with the internal disk occurs due to pushing forces of the cam against the external disk 34 which pushes the internal disk against the shoe. Pressure on the external disk 34 from the cam 28, in the contact position, results in a pinching effect on the external disk 34 which causes a pinching effect on the internal disk 36.

Wheelchair propulsion may be achieved by the rotation of the cam 28 into the contact position and rotation of the lever 30*a* about the axle 24*a*, with or without the presence of the shoe 52. However, the shoe 52 may impart additional forces on the other side of the drive wheel 22*a* when the cam 28 is in the contact position which assists in gripping the drive wheel, thus its presence is desirable.

The rotation process will be further described with regard to the drive associated with drive wheel 22*a* however, typically during wheelchair operation, both levers 30*a* and 30*b* are rotated simultaneously about the respective lever axes or about the respective axles. When both cams of the drive wheels 22*a* and 22*b* have been rotated into the contact position and both levers 30*a* and 30*b* are rotated about the axle, a greater momentum may be achieved. If lesser momentum were desired, the user could utilize a single lever to propel the wheelchair 10. Referring again to FIGS. 3*a*, 4*a* and 7, in order to move forward in the wheelchair 10, a user selectively rotates lever 30*a* about the lever axis x such that an outer surface, such as 61*a* (FIG. 2*b*) of the greater length section 46*a* of the cam 28, makes contact with the external disk 34. The lever 30*a* may alternatively be rotated such that an outer surface 61*b* of the greater length section 46*b* of the cam 28 makes contact with the external disk 34. The user then rotates the lever 30*a* in a first direction about the axle 24*a* (see FIG. 1, arrow A) to cause the wheelchair 10 to move forwardly. Rotation of the lever 30*a* about the lever axis x and rotation of the lever 30*a* about the axle 24*a* may occur simultaneously or sequentially. Referring to FIGS., 2*a*, 5, and 6, at the bottom of the first stroke, the user rotates the lever 30*a* about the lever axis x such that the lesser length section 44 of the cam 28 faces the external disk 34 and such that the gap 50 is present between the external disk 34 and the cam 28 allowing for free rotation of the lever 30*a* about the axis x. The lever 30*a* is then freely rotated back to a top position for another forward stroke.

To achieve a backward movement, the user selectively rotates the lever about the lever axis x such that the lesser length section 44 of the cam 28 faces the external disk 34, thus the user is able to freely move the lever 30*a* to a bottom position without frictionally engaging the external disk 34. At the bottom position, the user rotates the lever 30*a* about the lever axis x such that the greater length section, 46*a* or 46*b* of the cam 28, contacts the external disk 34. Upon rotation of the lever 30*a* about the axle and back to a top position in a direction opposite arrow A, a user moves the wheelchair rearwardly.

Though reference to a particular cam may have been made in describing the method of the present invention and a wheelchair utilizing the drive of the present invention, other shapes and sizes of cams including lesser and greater length sections, may be utilized.

What is claimed is:

1. A drive for a wheelchair having a chair frame, a pair of lesser diameter wheels mounted to the frame at a front base section thereof, and two larger diameter drive wheels with axles mounted to the frame at a rear section thereof, the drive mechanism with regard to each drive wheel comprising:

(a) first and second disks flanking the drive wheel, each disk defining a contact surface and being in fixed rotational relation with the drive wheel about the axle;

(b) a lever having a lever axis, the lever rotatable about the axle and about the lever axis;

(c) a cam selectively rotatable about the lever axis by the lever to and from a first contact position and a second non-contact position with respect to the contact surface of the first disk, wherein said cam includes an opening and said lever is inserted within said opening; and (d) a shoe positioned for contacting the contact surface of the second disk when the cam is in the first position, thereby sandwiching the drive wheel in relation between the cam and the shoe, the drive wheel released from the sandwiching relation upon lever rotation of the cam about the lever axis to the second position, wherein the drive wheel is propelled upon lever rotation about the axle when the drive wheel is in the sandwiching relation.

2. The drive of claim 1 wherein said cam includes a greater length section and a lesser length section.

3. The drive of claim 2 wherein said first disk is an outer disk and wherein in said first position, said greater length section contacts said outer disk.

4. The drive of claim 3 wherein in said second position said lesser length section faces said outer disk and a gap is present between said cam and said outer disk.

5. The drive of claim 1 wherein said cam is plastic.

6. The drive of claim 1 wherein said cam is like cylindrical in shape.

7. The drive of claim 2 wherein said lesser length and greater length sections include flat surfaces.

8. The drive of claim 1 wherein said first disk is an outer disk and said second disk is an inner disk and said inner and outer disks are connected to each other.

9. The drive of claim 1 wherein said first and second disks are plastic.

10. The drive of claim 1 wherein said shoe is rubber.

11. The drive of claim 1 wherein said shoe includes an opening through which a rod is inserted.

12. The drive of claim 11 wherein said rod is connected to said lever.

13. The drive of claim 11 wherein said shoe is fixed with respect to said rod.

14. The drive of claim 1 wherein said first position is a pushing position and said second position is a non-pushing position.

15. The drive of claim 1 wherein said first disk is an outer disk and said second disk is an inner disk and when the cam is in said first position and upon rotation of said lever about said axis, said cam and said shoe frictionally engage said inner and outer disks, respectively, and rotate about said axle.

16. A drive for a wheelchair having a chair frame, a pair of lesser diameter wheels mounted to the frame at a front base section thereof, and two larger diameter drive wheels with axles mounted to the frame at a rear section thereof, the drive mechanism with regard to each drive wheel comprising:

(a) first and second disks flanking the drive wheel, each disk defining a contact surface and being in fixed rotational relation with the drive wheel about the axle;
(b) a lever having a lever axis, the lever rotatable about the axle and about the lever axis;
(c) a cam selectively rotatable about the lever axis by the lever to and from a first contact position and a second non-contact position with respect to the contact surface of the first disk;
(d) a shoe positioned for contacting the contact surface of the second disk when the cam is in the first position, thereby sandwiching the drive wheel in relation between the cam and the shoe, the drive wheel released from the sandwiching relation upon lever rotation of the cam about the lever axis to the second position, wherein the drive wheel is propelled upon lever rotation about the axle when the drive wheel is in the sandwiching relation; and
(e) a handle connected to an upper portion of the lever and in fixed rotational relation with the lever.

17. The drive of claim 16 wherein said handle is substantially transverse to said lever.

18. A drive for a wheelchair having a chair frame, a pair of lesser diameter wheels mounted to the frame at a front base section thereof, and two larger diameter drive wheels with axles mounted to the frame at a rear section thereof, the drive mechanism with regard to each drive wheel comprising:

(a) inner and outer disks flanking the drive wheel, each disk defining a contact surface and being in fixed rotational relation with the drive wheel about the axle;
(b) a lever having a lever axis, the lever rotatable about the axle and rotatable about the lever axis;
(c) a cam selectively rotatable about the lever axis by the lever to and from a contact position and a non-contact position with respect to the contact surface of the outer disk, wherein said cam includes an opening and said lever is inserted within said opening; and
(d) a shoe positioned for contacting the contact surface of the inner disk when the cam is in the contact position, wherein the cam and shoe frictionally engage the respective contact surfaces upon lever rotation about the axle when the cam is in the contact position, propelling said wheelchair.

19. The drive of claim 18 cam includes a greater length section and a lesser length section.

20. The drive of claim 19 wherein in said first position said greater length section contacts said outer disk.

21. The drive of claim 20 wherein in said second position said lesser length section faces said outer disk and a gap is present between said cam and said outer disk.

22. The drive of claim 19 further comprising a second greater length section.

23. The drive of claim 18 wherein said opening is an off-center opening.

24. The drive of claim 18 wherein said opening divides said cam into a greater length section and a lesser length section.

25. A drive for a wheelchair having a chair frame, a pair of lesser diameter wheels mounted to the frame at a front base section thereof, and two larger diameter drive wheels with axles mounted to the frame at a rear section thereof, the drive mechanism with regard to each drive wheel comprising:

(a) inner and outer disks flanking the drive wheel, each disk defining a contact surface and being in fixed rotational relation with the drive wheel about the axle;
(b) a lever having a lever axis, the lever rotatable about the axle and rotatable about the lever axis,
(c) a cam selectively rotatable about the lever axis by the lever to and from a contact position and a non-contact position with respect to the contact surface of the outer disk;
(d) a shoe positioned for contacting the contact surface of the inner disk when the cam is in the contact position, wherein the cam and shoe frictionally engage the respective contact surfaces upon lever rotation about the axle when the cam is in the contact position, propelling said wheelchair; and
(e) a handle connected to an upper portion of the lever and in fixed rotational relation with the lever.

26. The drive of claim 25 wherein said handle is substantially transverse to said lever.

* * * * *